United States Patent [19]

Young et al.

[11] Patent Number: 4,599,182

[45] Date of Patent: Jul. 8, 1986

[54] WELL TREATING COMPOSITION AND METHOD

[75] Inventors: Peter J. Young; Julian M. E. Romocki, both of Calgary, Canada

[73] Assignee: Amerigo Technology Limited, Calgary, Canada

[21] Appl. No.: 487,049

[22] Filed: Apr. 21, 1983

Related U.S. Application Data

[63] Continuation of Ser. No. 97,151, Nov. 26, 1979, abandoned.

[30] Foreign Application Priority Data

Apr. 20, 1979 [CA] Canada ................................ 325951

[51] Int. Cl.$^4$ .............................................. E21B 43/27
[52] U.S. Cl. ................................ 252/8.55 C; 166/307
[58] Field of Search ................ 252/8.55 C, 8.55 B; 166/307

[56] References Cited

U.S. PATENT DOCUMENTS

| | | | |
|---|---|---|---|
| 2,175,095 | 10/1939 | Stoesser | 252/8.55 |
| 2,763,326 | 9/1956 | Cardwell et al. | 252/8.55 X |
| 2,814,593 | 11/1957 | Beiswanger et al. | 252/8.55 |
| 3,095,379 | 6/1963 | Schwartz | 252/101 |
| 3,294,695 | 12/1966 | Tippett | 252/8.55 X |
| 3,348,613 | 10/1967 | Irani | 252/8.55 X |
| 3,642,641 | 2/1972 | Tedeschi et al. | 252/8.55 X |
| 3,916,994 | 11/1975 | Maddox et al. | 252/8.55 X |

*Primary Examiner*—Herbert B. Guynn
*Attorney, Agent, or Firm*—Sixbey, Friedman & Leedom

[57] ABSTRACT

There is disclosed a method of treating a subterranean substantially carbonate-free sandstone formation associated with a well completed in said substantially carbonate-free sandstone formation comprising displacing into said formation through said well an effective amount of an acidic aqueous solution comprising from about 5 to about 36 weight % phosphoric acid, from about 0.6 to about 5 weight % of a highly polar surface active agent which is a citric acid-monoethanolamine elimination reaction product, and an effective amount of a ferrous metal corrosion inhibitor. For treating a subterranean limestone or dolomitic formation or a sandstone formation having a substantial carbonate content there is additionally included in the acidic aqueous solution an amount of a phosphate crystal modifying agent sufficient to control crystal growth, minimize crystal agglomeration and minimize crystal adhesion to the formation. The acidic aqueous solutions exhibit clay shrinking and/or stabilizing properties and a lengthy spending time relative to that of conventional hydrochloric acid-based acidizing compositions.

16 Claims, No Drawings

WELL TREATING COMPOSITION AND METHOD

This application is a continuation of application Ser. No. 097,151 filed Nov. 26, 1979, now abandoned.

FIELD OF THE INVENTION

This invention relates to workover and completions fluids for use in wells completed in subterranean formations and to methods of treating associated subterranean formations and perforating cased wells.

DESCRIPTION OF THE PRIOR ART

Acidic aqueous solutions are frequently used to treat subterranean formations associated with a well to increase the permeability of the formation so as to be more productive or, in the case of injection wells, more receptive to fluid displacement into the formation.

Hydrochloric acid is commonly used in acidizing fluids, although a number of other acids such as hydrofluoric acid, phosphoric acid, acetic acid, formic acid, among others, and acid mixtures, have been employed, normally with a variety of additives such as surfactants, demulsifiers, corrosion inhibitors, etc.

Dependent upon the formation, acidizing fluids are commonly employed to dissolve carbonates or other soluble organic deposits and/or to dehydrate, or shrink, clays.

A problem common to acidizing is the production of precipitates within the formation pores by the action of the acid or its byproducts on some precipitate-forming constituent of the formation. The precipitates, which are generally produced when the acid is spent, can plug the formation. This can be a particular problem with acidizing fluids employing phosphoric acid, or an acid mixture containing phosphoric acid, since calcium and magnesium compounds which are commonly found in some formations form insoluble phosphates when contacted with phosphoric acid.

Another common problem in clay-containing formations is that clays which are dehydrated by an acidizing fluid, unless somehow stabilized, will subsequently rehydrate in the presence of spent acidizing fluid or formation water. In some cases the clays swell to a degree such that volumetrically they occupy more space than that prior to the acidization. In some cases there is also a tendency for the dehydrated clays to disperse within the formation and then subsequently rehydrate in the presence of spent acidizing fluids or formation water. In either case the result can be a significant lessening of formation permeability relative to that prior to the acidization.

An additional drawback relatively common to the prior art is that many acidizing fluids must be handled with extreme care in that they employ fuming acids, and are caustic to skin. Furthermore, environmentally safe disposal of prior art acidizing fluids, even if spent, can be a problem.

The present invention is concerned with multi-functional acidizing fluids in the form of specified acidic aqueous solutions which are free from a number of the disadvantages associated with prior art acidizing fluids, with methods of treatment of subterranean formations with specified acidic aqueous solutions and with methods of perforating cased wells using specified acidic aqueous solutions as perforating fluids.

Broadly the invention provides a workover and completions fluid for use in wells completed in limestone or dolomitic formations or in sandstone formations having a substantial carbonate content, which comprises an acidic aqueous solution comprising phosphoric acid, a citric acid-monoethanolamine elimination reaction product, a ferrous metal corrosion inhibitor and a phosphate cyrstal modifying agent, and methods of displacing such an acidic aqueous solution into limestone or dolomitic formations or sandstone formations having a substantial carbonate content.

The invention also provides methods of treating substantially carbonate-free sandstone formations by displacing into the formation an acidic aqueous solution comprising phosphoric acid, citric acid-monoethanolamine elimination reaction product and a ferrous metal corrosion inhibitor, as well as methods of perforating cased wells employing the acidic aqueous solution as the perforating fluids.

The citric acid-monoethanolamine elimination reaction product employed in the acidic aqueous solutions is essentially that taught in Schwartz U.S. Pat. No. 3,095,379, issued June 25, 1963, as will be discussed in greater detail hereinafter.

While it is clear that Schwartz recognized the compatability of the citric acid-monoethanolamine reaction product with dilute acidic aqueous solutions, including phosphoric acidbased solutions, it had not previously been recognized, nor expected, that certain acidic aqueous solutions comprising phosphoric acid and the citric acid-monoethanolamine reaction product possessed a unique ability to shrink and stabilize clays. Furthermore, while Schwartz states at Column 1, lines 40 and 41 that the citric acid-monoethanolamine reaction product "has outstanding properties of corrosion inhibition" the degree of corrosion inhibition displayed towards ferrous metal proved to be totally unacceptable for use in wells, at least at bottomhole temperatures. Thus despite the "outstanding properties" described by Schwartz it has been found absolutely essential that the acidic aqueous solutions additionally comprise an effective amount of a ferrous metal corrosion inhibitor. While Schwartz also states at Column 3, lines 8 and 9, with reference to the citric acid-monoethanolamine reaction product, that "there is no upper limit to the concentration which is usable" it has been found that for the purposes intended by the present applicant that there is an effective upper limit for the product of about 5 weight % as otherwise the aqueous acidic solutions do not possess effective clay dispersion properties.

For descaling pumps there has in the past been employed an acidic aqueous solution comprising phosphoric acid, the citric acid-monoethanolamine reaction product, sodium hexametaphosphate, Dowfax 2A1 ® and O.B.Hibit ®. It had not however been recognized that the inclusion of sodium hexametaphosphate, a constituent sometimes employed in boiler descaling fluids, in such a solution would damage limestone or dolomitic formations or sandstone formations having a substantial carbonate content. This lack of recognition was not however unexpected since the prior usage involved the descaling of pulled pumps. The present applicant attempted to improve the permeability of a limestone formation by the displacement into the formation of such an acidic aqueous solution and blocked the formation. It was subsequently determined that the sodium hexametaphosphate was detrimental to the desired purpose and, indeed, that it was necessary to additionally include in the formulation a phosphate crystal modifying agent to prevent precipitate blockage of such formations.

SUMMARY OF THE INVENTION

In one particular aspect the present invention provides a workover and completions fluid for use in a well completed in a limestone or dolimitic formation or a sandstone formation having a substantial carbonate content comprising an acidic aqueous solution comprising from about 5 to about 36 weight % phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 450 nm, a plateau from 460 n, to 465 nm, an absorption maximum at 450 nm and extinction coefficients as follows:

$\epsilon_{475} = 0.325$ l/gm.cm
$\epsilon_{462} = 0.379$ l/gm.cm
$\epsilon_{450} = 0.509$ l/gm.cm, an effective amount of a ferrous metal corrosion inhibitor, and an amount of a phosphate crystal modifying agent sufficient to control crystal growth, minimize crystal agglomeration and minimize crystal adhesion to the formation.

In another particular aspect the present invention provides a workover and completions fluid concentrate intended for aqueous dilution to yield an acidic aqueous solution comprising from about 5 to about 36 weight % phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$\epsilon_{475} = 0.325$ l/gm.cm
$\epsilon_{462} = 0.379$ l/gm.cm
$\epsilon_{450} = 0.509$ l/gm.cm, an effective amount of a ferrous metal corrosion inhibitor, and an amount of a phosphate crystal modifying agent sufficient to control crystal growth, minimize crystal agglomeration and minimize crystal adhesion to the formation, said concentrate comprising up to about 85 weight % phosphoric acid, sufficient of said citric acid-monoethanolamine elimination reaction product to provide upon dilution an amount of from about 0.6 to about 5 weight %, an amount of said ferrous metal corrosion inhibitor sufficient upon dilution to inhibit ferrous metal corrosion, and an amount of said crystal modifying agent sufficient upon dilution to control crystal growth, minimize crystal agglomeration and minimize crystal adhesion to the formation.

In yet another particular aspect the present invention provides a method of treating a subterranean formation associated with a well comprising displacing into said formation through said well an effective amount of an acidic aqueous solution comprising from about 5 to about 36 weight % phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$\epsilon_{475} = 0.325$ l/gm.cm
$\epsilon_{462} = 0.379$ l/gm.cm
$\epsilon_{450} = 0.509$ l/gm.cm, and an effective amount of a ferrous metal corrosion inhibitor.

In a further particular aspect the present invention provides a method of treating a subterranean substantially carbonate-free sandstone formation associated with a well completed in said substantially carbonate-free sandstone formation comprising displacing into said formation through said well an effective amount of an acidic aqueous solution comprising from about 5 to about 36 weight % phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 n, to 465 nm, an absorption maximum at 450 nm, and extinction coefficients as follows:

$\epsilon_{475} = 0.325$ l/gm.cm
$\epsilon_{462} = 0.379$ l/gm.cm
$\epsilon_{450} = 0.509$ l/gm.cm, and an effective amount of a ferrous metal corrosion inhibitor.

In yet a further particular aspect the present invention provides a method of treating a subterranean limestone or dolomitic formation or a sandstone formation having a substantial carbonate content associated with a well completed in said limestone or dolomitic formation or said sandstone formation having a substantial carbonate content comprising displacing into said formation through said well an effective amount of an acidic aqueous solution comprising from about 5 to about 36% by weight phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 n, and extinction coefficients as follows:

$\epsilon_{475} = 0.325$ l/gm.cm
$\epsilon_{462} = 0.379$ l/gm.cm
$\epsilon_{450} = 0.509$ l/gm.cm, an effective amount of a ferrous metal corrosion inhibitor, and an amount of a phosphate crystal modifying agent sufficient to control crystal growth, minimize crystal agglomeration and minimize crystal adhesion to the formation.

In even a further particular aspect the present invention provides in a method of perforating a cased well where a perforating fluid is introduced into the casing to minimize the risk of formation damage resulting from desired or incidental contact of the formation by the perforating fluid upon perforation the improvement comprising utilizing as the perforating fluid an acidic aqueous solution comprising from about 5 to about 36% by weight phosphoric acid, from about 0.6 to about 5% by weight of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$\epsilon_{475} = 0.325$ l/gm.cm
$\epsilon_{462} = 0.379$ l/gm.cm
$\epsilon_{450} = 0.509$ l/gm.cm, and an effective amount of a ferrous metal corrosion inhibitor.

DESCRIPTION OF THE PREFERRED EMBODIMENTS

The acidic aqueous solutions of the invention and the acidic aqueous solutions employed in the methods of the invention possess clay shrinking and stabilizing properties, an ability to dissolve organic deposits such as carbonates, and an ability to penetrate and disperse insoluble deposits such as muds and clays.

The acidic aqueous solutions are non-fuming, and are not caustic to skin. Additionally, the acidic aqueous solutions do not create environmental safety disposal problems and, in fact, at proper concentrations can be excellent fertilizers.

The acidic aqueous solutions are also relatively non-corrosive, due to the use of effective inhibitors. A representative acidic aqueous solution of the invention did not show a measurable rate of corrosion of 1020 mild steel at room temperature, whereas a well-inhibited 15% hydrochloric acid solution showed a rate of corrosion of 1020 mild steel of about 7 mils per year at room temperature. At a temperature of about 71° C. a well-inhibited 15% hydrochloric acid solution showed a rate of corrosion of 1020 mild steel of about 40 mils per year. However, most hydrochloric acid corrosion inhibitors are known to breakdown quite quickly, frequently at about 12 hours at bottomhole conditions. In contrast, the representative acidic aqueous solution of the invention showed a rate of corrosion of 1020 mild steel of 40 mils per year over an extended test at about 82° C.

Representative acidic aqueous solutions of the invention display, against calcium carbonate, a spending time at room temperature approximately 40 times slower than that of a conventional hydrochloric acid-based acidizing fluid, and a spending time at about 93° C. approximately 20 times slower than a conventional hydrochloric acid-based acidizing fluid. The retarded reaction rate is beneficial in high temperature formations in which conventional acidizing fluids spend too rapidly for effective stimulation.

The primary constituents of the acidic aqueous solutions are as follows:

PHOSPHORIC ACID

The phosphoric acid employed in the acidic aqueous solutions is typically a technical grade, since greater purity is not normally required. The phosphoric acid employed is conventionally a 54%, 75%, or 85% technical grade and the choice of concentration can be varied dependent upon cost or, in the case of concentrate manufacture, on the desired acid concentration of the concentrate.

CITRIC ACID-MONOETHANOLAMINE ELIMINATION REACTION PRODUCT

The citric acid-monoethanolamine elimination reaction product can be prepared according to the general teachings of Schwartz U.S. Pat. No. 3,095,379, issued June 25, 1963. Contrary to the teachings of Schwartz, it has however been found that it is neither necessary that the citric acid-monoethanolamine elimination reaction be conducted at a temperature of at least about 150° C., or that a temperature of at least about 150° C. be maintained until gas evolution ceases. The elimination reaction does in fact proceed at temperatures less than 150° C., although the reaction rate is temperature dependent. Furthermore, the elimination reaction yields active product as of the initial exothermicity and the cessation of gas evolution merely indicates that the elimination reaction has gone to completion. For purposes of the present specification, any reference to a particular weight % of the citric acid-monoethanolamine elimination reaction product is thus intended to refer to that particular weight % of active elimination reaction product. Schwartz is however correct in stating that the reaction must be carried out at a temperature less than the decomposition temperature.

The elimination reaction product is best characterized as a highly polar surface active agent which is a citric acid-monoethanolamine elimination reaction product characterized by a visible absorption spectrum which displays an increasing extinction coefficient from the red to the near U.V. with some structure, an absorption maximum at 475 mn, a plateau from 460 mn to 465 nm, an absorption maximum at 450 nm and extinction coefficients as follows:

$\epsilon_{475} = 0.325$ l/gm.cm
$\epsilon_{462} = 0.379$ l/gm.cm
$\epsilon_{450} = 0.509$ l/gm.cm.

FERROUS METAL CORROSION INHIBITOR

Preferred corrosion inhibitors are organic passivators such as diethyl thiourea (Pennzone E ®), dibutyl thiourea, O.B.Hibit ®, Nambit ®, NACAP ®, and the like. The corrosion inhibitor can also be of the filming amine or filming amine/propargyl alcohol types but these are likely to display relatively fast inhibition breakdown at bottomhole temperatures.

Diethyl thiourea is particularly preferred as the corrosion inhibitor due to its solubility and thermal stability at low pH.

Dependent upon the particular corrosion inhibitor employed, the amount used is likely to vary from about 0.1 to about 1 weight %.

For the preferred corrosion inhibitor, diethyl thiourea, the amount used is in the range of from about 0.1 to about 1 weight %, the preferred range being from about 0.2 to about 0.5 weight %, with the particularly preferred amount being about 0.25 weight %.

Other suitable ferrous metal corrosion inhibitors will be obvious to those skilled in the art.

While the acidic aqueous solutions are multi-functional, the amounts of phosphoric acid and citric acid-monoethanolamine elimination reaction product in the acidic aqueous solutions can be varied, within the broad ranges of from about 5 to about 36 weight % phosphoric acid and from about 0.6 to about 5 weight % citric acid-monoethanolamine elimination reaction product, dependent upon the primary function desired of a particular treatment.

When the primary desired function of a treatment is the dissolution of acid solution deposits, such as carbonates, many sulfides and many oxides, the preferred ranges are from about 15 to about 22 weight % phosphoric acid and from about 1 to about 1.5 weight % citric acid-monoethanolamine elimination reaction product, with the particularly preferred amounts being about 20 weight % phosphoric acid and about 1.3 weight % citric acid-monoethanolamine elimination reaction product.

When the primary desired function of a treatment is to dehydrate and/or control the hydration or rehydration of clays, in other words when the primary function is clay shrinking and/or stabilizing, the preferred ranges are from about 5 to about 22 weight % phosphoric acid and from about 1 to about 2.5 weight % citric acid-monoethanolamine elimination reaction product, with the particularly preferred amounts again being about 20 weight % phosphoric acid and about 1.3 weight % citric acid-monoethanolamine elimination reaction product.

When the primary desired function of a treatment is the penetration and dispersion of acid insoluble organic and inorganic deposits, including oils, waxes, asphaltenes, resin precipitates of petroleum origin, muds and clays, the preferred amounts are from about 10 to about 28 weight % phosphoric acid and from about 1 to about 5 weight % citric acid-monoethanolamine elimination reaction product, with the particularly preferred amounts being about 24 weight % phosphoric acid and about 2.5 weight % citric acid-monoethanolamine elimination reaction product.

Other constituents which can be incorporated in the acidic aqueous solutions are as follows:

PHOSPHATE CRYSTAL MODIFYING AGENT

A phosphate crystal modifying agent is included in the acidic aqueous solution when it is to be used for treating a well completed in a limestone or dolomitic formation or a sandstone formation having a substantial carbonate content, i.e. of about 4% or more. The phosphate crystal modifying agent should be incorporated in the acidic aqueous solution in an amount effective to control crystal growth, minimize crystal agglomeration and minimize crystal adhesion to the formation.

Suitable phosphate crystal modifying agents include water soluble low to medium molecular weight polyacrylate polymers such as Calnox 214 ® (a relatively low molecular weight polymer which inhibits carbonate and sulfate scale). While phosphonates, phosphonic acids and polyphosphonates are not in themselves effective as phosphate crystal modifying agents, approximately equal combinations of a low to medium molecular weight polyacrylate polymer together with a member of the group consisting of water soluble phosphonates, phosphonic acids and polyphosphonates have proven most effective. Examples of this type of phosphate crystal modifying agent are Calnox 167 ®, (a blend of an organic phosphonate and a low molecular weight polymer) Acro Base 1220 ® (a neutralized blend of a phosphonic acid and an acid form of a low molecular weight polymer) and CASI 773 ® (a combination of a polymer and a phosphonate).

Particularly preferred is CASI 773 ® due to its solubility and thermal stability at low pH.

Dependent upon the particular phosphate crystal modifying agent employed, the amount used is likely to vary from about 0.2 weight % up to the solubility limit.

For the preferred phosphate crystal modifying agent, CASI 773 ®, the amount used is in the range of about 0.2 to about 2 weight %, the preferred range being from about 0.5 to about 1 weight %, with the particularly preferred amount being about 0.8 weight %.

Other phosphate crystal modifying agents will be obvious to those skilled in the art.

SURFACTANT

While the citric acid-monoethanolamine elimination reaction product is a surface active agent, it is frequently desirable to include an amount of another surfactant sufficient to impart improved surface active properties. Many nonionic or anionic surfactants are useful for this purpose. Alkyl aryl sulfonates are preferred, in particular Dowfax 2A1 ® (a mixture of sodium monododecylphenoxybenzenedisulfonate and sodium didodecylphenoxybenzenedisulfonate).

For the preferred additional surfactant, Dowfax 2A1 ®, the amount used is in the range of about 0.05 to about 3 weight %, the preferred range being from about 0.2 to about 1 weight %, with the particularly preferred amount being about 0.5 weight %.

Other suitable nonionic or anionic surfactants will be obvious to those skilled in art.

HYDROXYACETIC ACID

Hydroxyacetic acid can be included in the acidic aqueous solutions of the invention in an amount in the range of from about 0.05 to about 1.5 weight %, the preferred range being from about 0.2 to about 0.6 weight %, with the particularly preferred amount being about 0.3 weight %.

While the exact function of the hydroxyacetic acid is not known it is speculated, without wishing to be bound by theory, that the hydroxyacetic acid acts either as a coupling agent and/or enhances the polarity of the citric acidmonoethanolamine elimination reaction product and/or acts as a retardant to keep the pH of largely expended acidic aqueous solutions low enough to minimize precipitation of calcium and magnesium phosphates, carbonates and sulfates.

ACID STABLE ANTIFOAMING AGENT

In some applications requiring large volumes of the acidic aqueous solutions of the invention a tendency to foam may cause handling problems during transfer from vessel to vessel.

It has been found that at least several acid stable antifoaming agents, including Antifoam B ® and NOSI ®, control or eliminate the foaming tendency. The preferred acid stable antifoaming agent is NOSI ® which displays antifoaming activity at a concentration of as little as about 20 ppm, and effectively renders the acidic aqueous solutions nonfoaming at a concentration of about 100 ppm.

Other suitable acid stable antifoaming agents will be obvious to those skilled in the art.

Concentrated acidic aqueous solutions suitable for dilution at the site of use to the desired acid concentration, to avoid undue shipping/freight charges between the manufacturing plant and site of use, can be prepared having a phosphoric acid concentration of up to about 85 weight %, which represents the most concentrated technical grade presently commercially available. The amounts of the citric acid-monoethanolamine elimination reaction product and the ferrous metal corrosion metal inhibitor, as well as the amounts of any of the additional constituents such as the phosphate crystal modifying agent, additional surfactant, hydroxyacetic acid and acid stable antifoaming agent, can be varied in proportion to the acid concentration of the concentrate and the ultimate dilution intended.

The following examples are representative of laboratory scale preparation and testing of compositions within the purview of the invention:

EXAMPLE 1

61 gm of monoethanolamine and 96 gm of citric acid are added to a beaker which is then heated to and maintained at 150° C. until gas evolution ceases. The resultant citric acid-monoethanolamine elimination reaction product is permitted to cool to below 100° C. and then dissolved in 300 ml of 75% phosphoric acid. The resultant solution is added to a further 1400 ml of 75% phosphoric acid and stirred until homogeneous. 20 gm of diethyl thiourea is subsequently added and the resultant solution again stirred until homogeneous.

The resultant solution is representative of a concentrate particularly intended for ultimate use in wells completed in substantially carbonate-free sandstone formations, and which can be readily diluted with water to the desired acid concentration.

EXAMPLE 2

The procedure of Example 1 is repeated and subsequently 65 gm of CASI 773 ® is added and the resultant solution stirred until homogeneous.

The resultant solution is representative of a concentrate particularly intended for ultimate use in wells completed in limestone or dolomitic formations or sandstone formations having a substantial carbonate content, and which can be readily diluted with water to the desired acid concentration.

EXAMPLE 3

When it is desired to enhance the surface active properties of the concentrates the procedures of Examples 1 and 2 are repeated and to each of the resultant solutions is added 34 gm of Dowfax 2A1 ® and the resultant solutions stirred until homogeneous.

EXAMPLE 4

When it is desired that hydroxyacetic acid be included in the concentrates, the procedures of Examples 1, 2 and 3 are repeated and to each of the resultant solutions is added 28 gm of hydroxyacetic acid and the resultant solutions stirred until homogeneous.

EXAMPLE 5

20 ml of an acidic aqueous solution comprising about 5 weight % phosphoric acid, about 1.3 weight % citric acid-monoethanolamine elimination reaction product and about 0.1 weight % diethyl thiourea was added to a 20 ml sample of hydrated Wyoming bentonite, a typical drilling mud. 20 ml of 5 weight % hydrochloric acid was added to another 20 ml sample of hydrated Wyoming bentonite, and 20 ml of water added to a further 20 ml sample of hydrated Wyoming bentonite. After exposure, the volume of the Wyoming bentonite treated with the acidic aqueous solution according to the invention had decreased through dehydration by about 20% compared to that of the water treated control sample, whereas the volume of the Wyoming bentonite treated with the hydrochloric acid solution had only decreased by about 10% compared to that of the water treated control sample. The supernatant from both acid treated samples was subsequently decanted and 20 ml of distilled water added to each sample. After exposure, the Wyoming bentonite which had been treated with the acidic aqueous solution according to the invention had not hydrated, at least to any appreciable extent, whereas the Wyoming bentonite which has been treated with the hydrochloric acid had hydrated back to approximately its original volume. The example thus demonstrates the effectiveness of acidic aqueous solutions according to the invention for the purpose of shrinking and stabilizing clays.

EXAMPLE 6

20 ml each of acidic aqueous solutions comprising:
(a) about 20 weight % phosphoric acid, about 0.1 weight % citric acid-monoethanolamine elimination reaction product and about 0.3 weight % diethyl thiourea;
(b) about 20 weight % phosphoric acid, about 0.5 weight % citric acid-monoethanolamine elimination reaction product and about 0.3 weight % diethyl thiourea;
(c) about 20 weight % phosphoric acid, about 1 weight % citric acid-monoethanolamine elimination reaction product and about 0.3 weight % diethyl thiourea;
(d) about 20 weight % phosphoric acid, about 2.5 weight % citric acid-monoethanolamine elimination reaction product and about 0.3 weight % diethyl thiourea;
(e) about 20 weight % phosphoric acid, about 5 weight % citric acid-monoethanolamine elimination reaction product and about 0.3 weight % diethyl thiourea were added to 20 ml samples of hydrated Wyoming bentonite. Upon exposure, the volume of the Wyoming bentonite of each sample had decreased through dehydration compared to that of a corresponding water treated control sample. The volume decrease of the sample treated with solution (a) was however very minimal. Additionally, in the sample treated with solution (e), the clay plug was not dispersed. The supernatant from each of the acid treated samples was subsequently decanted and 20 ml of distilled water added to each. After exposure, the Wyoming bentonite samples which had been treated with solutions (a) and (b) increased in volume to a far greater degree than the other samples. The results indicate, at least with the relative amounts of clay/acidic aqueous solution tested, that a given minimum of the citric acid-monoethanolamine elimination reaction product is necessary in the acidic aqueous solutions to dehydrate clays and to prevent clays from hydrating, whereas at an amount of about 5 weight % the citric acid-monoethanolamine elimination reaction product in the acidic aqueous solutions appears to interfere with clay dispersion.

EXAMPLE 7

A core of shaley sandstone from the Viking formation in the Hamilton Lake field, Alberta, Canada, where wells characteristically display water sensitivity, was tested by Core Labs - Canada Ltd., Calgary, Alberta, Canada, in the following manner:

The core was artificially cleaned and dried, and displayed an initial permeability of about 366 milliDarcy's to a test brine solution under a differential pressure of about 10 psi. As is typical of this type of core, permeability had decreased to about 133 milliDarcy's during passage of 30 pore volumes of the brine, i.e. during approximately one-half hour of contact time to the brine. 30 pore volumes of an acidic aqueous solution comprising about 20 weight % phosphoric acid, about 1.3 weight % citric acid-monoethanolamine elimination reaction product, about 0.25 weight % diethyl thiourea, about 0.5 weight % Dowfax 2A1 ® and about 0.3 weight % hydroxyacetic acid were then passed through the core, again under a differential pressure of about 10 psi. No suspended solids were found in the effluent. Subsequent permeability of the core to the same test brine was stable at about 321 milliDarcy's after extended contact. The fact that there were no suspended solids in the acidic aqueous solution effluent indicates that the increase in permeability is due to dehydration (shrinkage) of water sensitive clays rather than dislodgement of clay particles from the core. Furthermore, the stable permeability displayed to the test brine following treatment with the acidic aqueous solution indicates that the acidic aqueous solution minimizes the hydration of dehydrated clays.

EXAMPLE 8

A limestone core from the Nisku formation in the Pembina field, Alberta, Canada, was tested by Core Labs - Canada Ltd., Calgary, Alberta, Canada, in the following manner:

The core was artificially cleaned and dried, and displayed an initial permeability of about 1.5 milliDarcy's to 30 pore volumes of a test brine solution under a differential pressure of about 10 psi. By the time 5 pore volumes of an acidic aqueous solution comprising about 20 weight % phosphoric acid, about 1.3 weight % citric acid-monoethanolamine elimination reaction product, about 0.25 weight % diethyl thiourea, about 0.5 weight % Dowfax 2A1 ® and about 0.3 weight % hydroxyacetic acid had been passed through the core, again under a differential pressure of about 10 psi, the permeability had decreased to about 0.06 milliDarcy's. In other words, the core had essentially blocked. The acidic aqueous solution effluent was found to contain significant amounts of sediment which proved to be calcium phosphate.

EXAMPLE 9

A limestone core from the Leduc formation in the Leduc field, Alberta, Canada, was tested by Core Labs - Canada Ltd., Calgary, Alberta, Canada, in the following manner:

The core was artificially cleaned and dried, and displayed an initial permeability of about 0.28 milliDarcy's to 30 pore volumes of a test brine solution under a differential pressure of about 10 psi. After about 8 pore volumes of an acidic aqueous solution comprising about 20 weight % phosphoric acid, about 1.3 weight % citric acid-monoethanolamine elimination reaction product, about 0.25 weight % diethyl thiourea, about 0.8 weight % CASI 773 ®, about 0.5 weight % Dowfax 2A1 ® and about 0.3 weight % hydroxyacetic acid had been passed through the core, again under a differential pressure of about 10 psi, there was a breakthrough and before the test apparatus could be shut-down about 500 pore volumes of the acidic aqueous solution had passed through the core. The core displayed significant deterioration and the acidic aqueous solution effluent initially had some solid matter particles, presumed to be calcium carbonate, which subsequently dissolved. Subsequent permeability of the core to the same test brine, again at a differential pressure of about 10 psi, was about 25.5 milliDarcy's. The results thus indicate a very significant increase in permeability as a result of the treatment with the acidic aqueous solution of the invention. Furthermore, as compared with the results of Example 8, this example demonstrates the desirability, or even necessity, of incorporating a phosphate crystal modifying agent, in this instance CASI 773 ®, in acidic aqueous solutions according to the invention which are to be used for treating limestone or dolomitic formations or sandstone formations having a substantial carbonate content.

Representative composition concentrates within the purview of the invention can be prepared on a commercial scale as follows:

EXAMPLE 10

460 pounds of monoethanolamine and 700 pounds of citric acid are added to a reaction vessel. After the initial exothermic reaction subsides the vessel is heated to and maintained at 150° C. until gas evolution ceases, typically about 6 hours. The resultant citric acid-monethanolamine elimination reaction product is permitted to cool to below 100° C., 1500 U.S. gallons of 75% phosphoric acid added and the resultant solution stirred until homogeneous. To the solution is subsequently added 334 pounds of diethyl thiourea, 576 pounds of hydroxyacetic acid and 719 pounds of Dowfax 2A1 ® and the resultant solution again stirred until homogeneous.

This concentrate is particularly intended for ultimate use in wells completed in substantially carbonate-free sandstone formations, and can be readily diluted with water to the desired acid concentration.

EXAMPLE 11

A concentrate for ultimate use in wells completed in limestone or dolomitic formations or sandstone formations having a substantial carbonate content can be prepared by repeating the procedure of Example 10 and additionally adding 1150 pounds of CASI-773 ® and stirring until homogeneous. Again the concentrate can be readily diluted with water to the desired acid concentration.

An acid stable antifoaming agent can also be added to the concentrates of Examples 10 and 11, if desired.

The following examples are representative of field use of compositions within the purview of the invention:

EXAMPLE 12

495 U.S. gallons of an acidic aqueous solution comprising about 36 weight % phosphoric acid, 2.4 weight % citric acid-monoethanolamine elimination reaction product, about 0.4 weight % diethyl thiourea, about 0.7 weight % Dowfax 2A1 ® and about 0.6 weight % hydroxyacetic acid were injected into a well completed in a substantially carbonate-free sandstone formation in the Gilbey field, Alberta, Canada. The solution was injected at a pressure greater than the formation pressure but below the fracturing pressure, in particular at a wellhead pressure of about 1500 psi, in a situation where there was approximately 2800 psi of hydrostatic head, since a fast feed rate was believed desirable. The well was making no fluids prior to treatment and, in fact, after being shut-in for over two weeks developed only 40 psi pressure on the casing. After injection the casing pressure climbed to 70 psi in less than 24 hours, indicating a significantly improved formation permeability. The injection was performed as a pre-fracturing clean-up.

EXAMPLE 13

A water injection well completed in a substantially carbonate-free sandstone formation in the Ferrier field, Alberta, Canada, had for several years accepted only about 50 barrels of water per day at a wellhead pressure of 2200 psi. Prior hydrochloric acid/additive treatments had not significantly altered the water acceptance of the formation. Treatment of the well with 1200 US gallons of an acidic aqueous solution comprising about 8 weight % phosphoric acid, about 0.6 weight % citric acid-monoethanolamine elimination reaction product, about 0.15 weight % diethyl thiourea, about 0.2 weight % Dowfax 2A1 ® and about 0.2 weight % hydroxyacetic acid, under the same 2200 psi wellhead pressure, improved the formation permeability to the point of accepting about 128 barrels per day of water at a wellhead pressure of 2200 psi. The increased water acceptance is indicative of a significant increase in formation permeability as a result of the treatment.

EXAMPLE 14

A well completed in a substantially carbonate-free sandstone formation in the West Pembina field, Alberta, Canada, and producing from the Belly River formation failed to respond to at least one prior conventional HF/HCl mud acid treatment. Little if any gas, and no oil, was being produced by the well. 500 U.S. gallons of an acidic aqueous solution comprising about 20 weight % phosphoric acid, about 1.3 weight % citric acid-monoethanolamine elimination reaction product, about 0.25 weight % diethyl thiourea, about 0.5 weight % Dowfax 2A1 ® and about 0.3 weight % hydroxyacetic acid were injected into the formation at a wellhead pressure of about 2200 psi. This injection pressure was significantly less than the injection pressure of about 3100 psi necessary for the previous HF/HCl mud acid treatment. Following treatment the well was flowing significantly more gas. Fully comparative figures are not however available since the well was newly completed and thus no production figures had been generated. However, the fact that the composition according to the invention could be injected at a significantly lower pressure than the previous HF/HCl mud acid treatment, and the relative increase in gas flow, indicate significant improvement in formation permeability.

EXAMPLE 15

A well completed in vugular limestone in the Redwater field, Alberta, Canada, was producing about 13 barrels of oil per day in a field where greater production was typical. Several hydrochloric acid/additive treatments had been carried out with no significant increase in production. 1000 U.S. gallons of an acidic aqueous solution comprising about 20 weight % phosphoric acid, about 1.3 weight % citric acid-monoethanolamine elimination reaction product, about 0.25 weight % diethyl thiourea, about 0.8 weight % CASI 773 ®, about 0.5 weight % Dowfax 2A1 ® and about 0.3 weight % hydroxyacetic acid were injected under a wellhead pressure of about 100 psi, in a situation where there was a hydrostatic head of approximately 2200 psi. Once the acidic aqueous solution introduced into the formation had been produced out of the well, about 20 hours, the well production rate increased to about 78 barrels of oil per day.

EXAMPLE 16

A well completed in a dolomitic formation in the Beaverhill Lake formation in the Swanhills field, Alberta, Canada, had never been a large producer. On a repetitive cycle of being pumped for 5 days and then shut-in for 10 days the well was producing about 160 barrels of oil per cycle. The production declined to about 70 barrels of oil per cycle. While the area is known to suffer from asphaltene drop-out and does have scale problems, although this particular well produced only traces of water, the reason for the production decline was not known. About 750 U.S. gallons of an acidic aqueous solution comprising about 20 weight % phosphoric acid, about 1.3 weight % citric acid-monoethanolamine elimination reaction product, about 0.25 weight % diethyl thiourea, about 0.8 weight % CASI 773 ®, about 0.5 weight % Dowfax 2A1 ® and about 0.3 weight % hydroxyacetic acid were displaced into the formation by way of an uncontrolled squeeze, i.e. by means of the hydrostatic head in the annulus of the well bore, the pressure of which exceeded the formation pressure. The well was subsequently put back on pump and has since produced approximately 200 barrels of oil per cycle. The increase in production is indicative of improved formation permeability.

The examples demonstrate that the acidic aqueous solutions possess clay shrinking and stabilizing properties, an ability to dissolve organic deposits such as carbonates, and an ability to penetrate and disperse insoluble deposits such as muds and clays. Additionally, while not demonstrated by the examples, the acidic aqueous solutions have proven to be of a non-emulsifying character and, in some cases, have displayed an ability to break water-in-oil emulsions of the type typically promoted by hydrochloric acid-based acidizing fluids.

The acidic aqueous solutions of the invention are also suitable for use as perforating fluids.

Cased wells are often perforated in such a condition that the hydrostatic pressure of the column of fluid in the casing overbalances the formation pressure with the result that, upon perforation, fluid in the casing flows into the formation. Ideally the perforating fluid should not cause any formation damage such a decrease in permeability and, in fact, should assist in cleaning the immediate perforations and improve the formation permeability. The ability of the acidic aqueous solutions of the invention to shrink Wyoming bentonite, a typical drilling mud, as is shown in Example 5, the ability to dissolve acid soluble deposits, as in shown in Example 9, and the relative lack of secondary precipitation are all desired characteristics of a perforating fluid and thus indicative of the suitability of acidic aqueous solutions of the invention as perforating fluids.

The acidic aqueous solutions of the invention are also suitable for use as formation fracturing fluids.

The acidic aqueous solutions of the invention are compatible with conventional gelling agents, such as guar flour, and conventional propping agents, such as graded sand of uniform spherical granular configuration, typically a 20 to 40 mesh silica sand, which are commonly employed to retain a formation in a fractured condition.

Modifications and variations within the true broad spirit and scope of the invention will be apparent to those skilled in the art.

We claim:

1. A workover and completions fluid for use in a well completed in a limestone or dolomitic formation or a sandstone formation having a substantial carbonate content comprising an acidic aqueous solution comprising from about 5 to about 36 weight % phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$\epsilon_{475} = 0.325$ l/gm.cm
$\epsilon_{462} = 0.379$ l/gm.cm
$\epsilon_{450} = 0.509$ l/gm.cm, an effective amount of a ferrous metal corrosion inhibitor, and an amount of a phosphate crystal modifying agent sufficient to control crystal growth, minimize crystal agglomeration and minimize crystal adhesion to the formation said phosphate crystal modifying agent being selected from the group consisting of polyacrylate polymers and blends of such polymers with a phosphonic acid or a phosphonate.

2. A workover and completions fluid according to claim 1 wherein the ferrous metal corrosion inhibitor is a dialkyl thiourea.

3. A workover and completions fluid according to claim 1 additionally including an amount of a nonionic or anionic surfactant sufficient to impart improved surface active properties.

4. A workover and completions fluid according to claim 1 additionally including hydroxyacetic acid.

5. A workover and completions fluid according to claim 1 additionally including an amount of a nonionic or anionic surfactant sufficient to impart improved surface active properties and hydroxyacetic acid.

6. A workover and completions fluid according to claim 1 wherein the phosphoric acid is present in an amount of from about 15 to about 22 weight % and the citric acid-monoethanolamine elimination reaction product is present in an amount of from about 1 to about 1.5 weight %.

7. A workover and completions fluid according to claim 6 wherein the phosphoric acid is present in an amount of about 20 weight % and the citric acid-monoethanolamine elimination reaction product is present in an amount of about 1.3 weight %.

8. A workover and completions fluid according to claim 1 wherein the phosphoric acid is present in an amount of from about 5 to about 22 weight % and the citric acid-monoethanolamine elimination reaction product is present in an amount of from about 1 to about 2.5 weight %.

9. A workover and completions fluid according to claim 1 wherein the phosphoric acid is present in an amount of from about 10 to about 28 weight % and the citric acid-monoethanolamine elimination reaction product is present in an amount of from about 1 to about 5 weight %.

10. A workover and completions fluid according to claim 9 wherein the phosphoric acid is present in an amount of about 24 weight % and the citric acid-monoethanolamine elimination reaction product is present in an amount of about 2.5 weight %.

11. A workover and completions fluid concentrate intended for aqueous dilution to yield an acidic aqueous solution comprising from about 5 to about 36 weight % phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$\epsilon_{475} = 0.325$ l/gm.cm
$\epsilon_{462} = 0.379$ l/gm.cm
$\epsilon_{450} = 0.509$ l/gm.cm, an effective amount of a ferrous metal corrosion inhibitor, and an amount of a phosphate crystal modifying agent sufficient to control crystal growth, minimize crystal agglomeration and minimize crystal adhesion to the formation, said concentrate comprising up to about 85 weight % phosphoric acid, sufficient of said citric acid-monoethanolamine elimination reaction product to provide upon dilution an amount of from about 0.6 to about 5 weight %, an amount of said ferrous metal corrosion inhibitor sufficient upon dilution to inhibit ferrous metal corrosion, and an amount of said crystal modifying agent sufficient upon dilution to control crystal growth, minimize crystal agglomeration and minimize crystal adhesion to the formation said phosphate crystal modifying agent being selected from the group consisting of polyacrylate polymers and blends of such polymers with a phosphonic acid or a phosphonate.

12. A workover and completions fluid concentrate according to claim 11 wherein the ferrous metal corrosion inhibitor is a dialkyl thiourea.

13. A workover and completions fluid concentrate according to claim 11 additionally including an amount of a nonionic or anionic surfactant sufficient upon dilution to impart improved surface active properties.

14. A workover and completions fluid concentrate according to claim 11 additionally including hydroxyacetic acid.

15. A workover and completions fluid concentrate according to claim 11 wherein the ferrous metal corrosion inhibitor is a dialkyl thiourea, and additionally including an amount of a nonionic or anionic surfactant sufficient upon dilution to impart improved surface active properties and hydroxyacetic acid.

16. A workover and completions fluid concentrate according to claim 15, further including an amount of an acid stable antifoaming agent sufficient upon dilution to prevent foaming.

* * * * *